United States Patent [19]
Rowse et al.

[11] 3,891,408
[45] June 24, 1975

[54] ZIRCONIA-ALUMINA ABRASIVE GRAIN AND GRINDING TOOLS

[75] Inventors: Robert A. Rowse, Shrewsbury, Mass.; George R. Watson, Chippawa, Canada

[73] Assignee: Norton Company, Worcester, Mass.

[22] Filed: Aug. 8, 1973

[21] Appl. No.: 386,718

Related U.S. Application Data

[63] Continuation-in-part of Ser. No. 287,489, Sept. 8, 1972, abandoned, which is a continuation-in-part of Ser. No. 249,204, May 1, 1972, abandoned, and Ser. No. 149,837, June 3, 1971, abandoned.

[52] U.S. Cl. .......... 51/295; 51/298; 51/309; 106/57; 106/65
[51] Int. Cl.² .... B24D 3/28; C09C 1/68; C09K 3/14
[58] Field of Search ........ 51/295, 309, 298; 106/57, 106/65

[56] References Cited
UNITED STATES PATENTS

| | | | |
|---|---|---|---|
| 2,194,472 | 3/1940 | Jackson | 51/298 |
| 2,740,725 | 4/1956 | Ball | 51/298 |
| 3,156,545 | 11/1964 | Kistler et al. | 51/309 |
| 3,175,894 | 3/1965 | Foot | 51/309 |
| 3,181,939 | 5/1965 | Marshall et al. | 51/309 |
| 3,205,054 | 9/1965 | Tucker | 51/298 |
| 3,607,162 | 9/1971 | Bockstiegel | 51/309 |
| 3,646,713 | 3/1972 | Marshall et al. | 51/309 |
| 3,781,172 | 12/1973 | Pett et al. | 51/309 |

*Primary Examiner*—Donald J. Arnold
*Attorney, Agent, or Firm*—Oliver W. Hayes

[57] ABSTRACT

Very rapid crystallization of eutectic and neareutectic molten mixtures of aluminum oxide and zirconium oxide, followed by crushing of the solidified melt, results in abrasive grits of very high strength combined with highly desirable microfracture properties. The zirconium oxide in the material is in the form of rods (or platelets) which, on the average, are less than 3000 angstroms in diameter, and preferably at least 25%, by weight, of the zirconium oxide is in the tetragonal crystal form. The solidified melt is made up of cells or colonies typically 40 microns or less across their width. Groups of cells having identical orientation of microstructure form grains which typically include from 2 to 100 or more cells or colonies. In crushing, the material fractures along grain boundaries and cell boundaries. Grinding improvement in excess of 100% of prior art standards is shown in tests of coated abrasive products employing the crushed abrasive material in typical applications and substantial improvement in bonded abrasive products.

9 Claims, No Drawings

ZIRCONIA-ALUMINA ABRASIVE GRAIN AND GRINDING TOOLS

BACKGROUND OF THE INVENTION

The present application is a continuation-in-part of prior copending application Ser. No. 287,489 filed Sept. 8, 1972, which in turn was a continuation-in-part of applications Ser. No. 249,204, filed May 1, 1972 and Ser. No. 149,837, filed June 3, 1971 all now abandoned.

This is an improvement in the fused alloy-type alumina-zirconia abrasive materials which have come into commercial use since about 1960.

U.S. Pat. No. 3,181,939 discloses the rapid crystallization of melts of alumina and zirconia, containing from 10 to 60%, by weight, of zirconia. The eutectic composition is reported to occur at 41% zirconia, by weight, (Schmid and Viechnicki, Journal of Materials Science 5 (1970) pp. 470 to 473) and can very somewhat due to impurities. We believe the more correct value is about 43% zirconia. The patent teaches rapidly cooling melts by casting into molds of from 25 to 300 pound capacity. The solidified product is crushed to produce abrasive grits which have been found suitable for snagging (rough grinding) applications when bonded in resinoid grinding wheels. Other alumina-zirconia abrasives commercially offerred for grinding wheels included "ZM Lionite," AZ 40 and R 81. None of these abrasives had all of the improved properties of the abrasive materials of this present invention.

U.S. application Ser. No. 814,162, filed Apr. 7, 1969, (of Quinan and Supkis), discloses the use in some coated abrasive applications of abrasive grits, covered by U.S. Pat. No. 3,181,939, but cooled to produce alumina crystals of 20 – 30 microns or less, as described in U.S. application Ser. No. 98,014 filed Dec. 14, 1970, which issued as U.S. Pat. No. 3,781,172 on Dec. 25, 1973, (Pett and Kinney). While Minnesota Mining had, on a limited basis, marketed a coated abrasive containing an alumina zirconia eutectic of blocky grit structure under the tradename "Cubicut," alumina-zirconia alloy-type abrasives have not been employed commercially for wide scale use in low pressure abrasive applications prior to the present invention. The Cubicut product had eutectic colonies typically 100 microns or more in average width.

In the copending application of Rowse and Lakhani there is described the use of the Pett and Kinney type of alumina-zirconia crystals having a "weak" shape for the manufacture of cut-off wheels.

In attempting to produce even finer microstructure in the abrasive by even more rapid cooling, the abrasive of the present invention was discovered. In accordance with the trend of earlier results, in which more rapid cooling lead to tougher abrasives more useful than the less rapidly cooled materials in the rough, heavy duty applications, it was expected that the most rapidly cooled material would follow this trend. Unexpectedly however, it was found that, when produced at near-eutectic compositions, the new abrasive, the subject of this application, was outstandingly useful in light duty applications.

Variation of cooling rates and compositional limits, in accordance with the present invention, have shown that near-eutectic mixtures of alumina and zirconia will exhibit the newly discovered properties only when solidified at such a rapid rate that at least one dimension of the zirconia rods or platelets present in the material, is on the order of 1000 – 2000 angstrom units or finer.

Thus, it has now been discovered, that by modifying the cooling conditions for these abrasives, and by employing a near-eutectic composition of alumina and zirconia, an entirely new family of abrasives can be produced having remarkable utility in low or moderate pressure applications, both in coated abrasive and bonded abrasive applications.

SUMMARY OF THE INVENTION

Alumina and zirconia sources are fused in an electric arc furnace to produce an alumina-zirconia melt containing from 35 to 50% zirconia, by weight, with total impurities being not over about 3% exclusive of titania in solid solution with alumina and/or zirconia and at 0.1% or below in the case of soda. Any suitable raw materials can be employed which, after fusion, including any purification taking place during the furnacing, result in the desired composition. Silica and titania may also be present in small amounts. Silica should be as low as possible (preferably below 0.3%) but at any rate should be below 1% in the product. Titania is less harmful than silica, and, in some cases may be deliberately included to obtain equivalent abrasives or to produce desired effects. Hafnia, in the amounts naturally present in zirconia sources is not considered an impurity.

Other impurities may be present in the abrasive either as impurities associated with the particular sources of zirconia and alumina employed, or, as in the case of MgO and CaO, they may be deliberately added. For some applications, the presence of CaO, up to 2% is desirable. With MgO, at levels above 4%, the alumina in the product is essentially all converted to magnesia deficient spinel.

The molten alumina-zirconia is then solidified at a very rapid rate. The very rapidly cooled product is characterized in that it is made up of generally oriented colonies of alumina-zirconia eutectic wherein the zirconia, when it precipitates in rod form, has an average diameter below 2000 angstrom units near the colony center, the zirconia rods being surrounded by an alumina matrix. A preferred composition is one (e.g., 43% $ZrO_2$) in which the primary alumina may crystallize first as a seed for the eutectic crystallization, the orientation of which is at least initially controlled by the orientation of the alumina seed. The eutectic crystallization is a simultaneous crystallization of alumina and zirconia according to the eutectic ratio. The combined seed and eutectic oriented mixture become an individual cell or colony on which the trigonal outline of the seed crystal may sometimes be visible. The colonies have dimensions of up to 60 microns, typically 5 to 60 microns, with a typical average cross-sectional dimension of less than 30 to 40 microns when observed in thin-sections or polished sections. They are usually grouped in granular formations consisting of a number of neighboring similarly oriented elongated, eutectic colonies with their long axes generally perpendicular to the cooling surface. The crystal form of the zirconia in such products preferably has as much as 25% or more of the zirconia in the tetragonal crystal form, which is, ordinarily, stable only at temperatures above 1000°C.

In the preceeding discussion of the size of the zirconia "rods" in the alumina zirconia eutectic colonies reference has been made to rod diameter. Measurements of the rod diameter have been achieved by direct scaling of scanning electron microscope photographs with magnifications of 5,000× to 10,000×; in some cases magnification of 20,000× has been used. Since the diameters of the zirconia rods generally increase from the center of the eutectic colonies to the outer edges of the colonies, it is preferred to make the measurements near the center of the colonies. This is also believed to be the most useful measuring technique in characterizing the colonies since the growth rate in various portions of the periphery of the colonies may be different (due to geometrical effects) and therefore the rod diameters and rod spacings will be different. Additionally, impurities will congregate at the edges of the colonies and this will also disrupt the rod spacings and rod diameters, thus giving dimensions which are generally considerably larger than the dimensions near the center of the colonies. We believe that the abrasive properties of the eutectic-containing abrasive grits are more critically dependent upon the dimensions at the colony centers.

While the discussion of zirconia particle size in the alumina zirconia eutectic has been based predominantly on size characterization of rods there is strong evidence that in addition to rods being present a substantial portion of the zirconia is in the form of platelets, these platelets having a thickness of the same order as the rod diameters. In some of the early work wherein rods were identified in scanning electron photomicrographs, further analysis of such samples indicates that these rods were in fact platelets. This determination was made by etching the alumina from the region of the zirconia alumina eutectic colony and reexamining the etched sample under a scanning electron microscope.

In the preceeding discussion the rod diameter has been referred to as an important parameter to be measured. As a practical matter it is probably better to use rod spacing as the measured parameter rather than rod diameter, since rod spacing is not as critically dependent upon the resolution of the electron microscope. This is particularly true where the rod appears to have a fuzzy edge and it may be difficult to precisely determine the actual diameter to be measured. However, the spacing between two (2) rods or two (2) platelets having fuzzy edges can be quite accurately measured by measuring the distance between the centers of the two rods or platelets. The rod spacing and rod diameters are directly related by the following approximate equation:

$$d_1 = \sqrt{\frac{\pi d_2^2}{4 V_f}}$$

Wherein $d_1$ is the distance between the centers of adjacent rods, $d_2$ is rod diameter and $V_f$ is the volume fraction of zirconia.

Platelet spacing and platelet thickness are also directly related.

In the measurement of rod (or platelet) spacing a convenient method to use is the random intercept technique which consists of drawing a straight line (real or imaginary) across a photomicrograph of the area where the rod spacing is to be measured, this line being normal to the rod axis or platelet plane. The number of rods or platelets intercepted by the line are then counted over a given distance to obtain the average rod or platelet spacing.

Another observable characteristic of the abrasive of this invention is the association of groups of colonies having similar orientation. Such groups of colonies, following the terminology of the metallurgists, are referred to as grains. Such grains may typically include from 2 to 100 or more colonies. Analysis by the electron microprobe shows that the great bulk of the impurities (95% or more) appears in the boundaries between colonies and between grains. The boundary material consists of the impurities in glassy and crystalline forms and may include elemental metals, and combinations of the metals with oxygen, carbon, and nitrogen. Aluminum and zirconium are also found in combined forms in the boundary phases. The colonies are essentially alumina and zirconia which may contain $TiO_2$ or other material in solid solution without adversely affecting its hardness or strength.

Abrasive grits, resulting from crushing the solidified abrasive, contain a plurality of colonies or cells and, depending upon their size may contain a plurality of grains. Useful commercial grit sizes range from about 6 grits to 180 grit size, and finer as defined by conventional grit sizing as, for example by the U.S. Department of Commerce Commercial Standard CS 271-65, issued Apr. 12, 1965.

The generally parallel orientation of associated elongated colonies and grains referred to previously, is believed to create the unique fracture characteristics of material of this invention which is particularly suited for use in coated abrasives. This new type of fracture provides continuous "sharpening" of the fractured grains by exposing new cutting edges, thereby prolonging the useful life of the abrasive. Such fracture, a major portion of which takes place along colony and grain boundaries results in striated or columnar surfaces along the plane of fracture parallel to the long axes of the colonies, and a stepped surface for fractures perpendicular to the axis of the colonies. When examined under a microscope with relatively small magnification the edges defined by intersection of two planes of fracture are discontinuous, jagged, and sharp. Also observable in some fractures is a jaggedness and irregularity in the columnar structure apparently resulting from slight misalignments of colonies in adjacent grains.

For the purposes of this application, the type of fracture described above and exhibited by grain particularly suited for coated abrasive applications is referred to herein as "pseudo-hackly" to distinguish from the term "hackly" as used by mineralogists in describing a somewhat different fracture exhibited by minerals (single crystal, or sometimes polycrystalline, compounds or elements) as distinguished from the composite (eutectic), finely crystalline, abrasive materials of this invention. When a large portion of the abrasive sized grits in a given batch of material of this invention exhibit the pseudo-hackly fracture described above, the abrasive is particularly suited to coated abrasive applications.

It has also been observed that in the abrasive material produced in pours of several hundred pounds, the material is normally not entirely homogenous and may contain grits which exhibit the presence of primary (non-eutectic) alumina crystals, grits which exhibit primary zirconia crystals, and grits which are essentially all-eutectic, with no evidence of primary crystals. Material which contains 50% or more of the all-eutectic grits is particularly preferred for coated abrasive applications. To determine the "% all-eutectic" grits the material is crushed to abrasive sized grits and polished sections are examined under an optical or scanning electron microscope. Those grits indicating the presence of primary alumina or primary zirconia crystals at this magnification are considered not to be all-eutectic and are subtracted from the total number of grits in the sample to determine the numerical % all-eutectic grits.

In preparing the abrasive grits of this invention the cast material is crushed and screened to obtain the desired grit sizes. Initial rough crushing may be by jaws or impact as conventional in the industry. Thereafter rolls crushing is desirable to produce more friable, elongated particles as may screening through slotted screens, depending upon the desired final grit form. By use of these techniques on the unique eutectic composition of the present invention an abrasive grit having a "weak" shape can be provided.

The abrasive grit of this invention, when the fusion conditions are reducing such that reduction products such as carbides, suboxides or metal inclusions are present in the cooled product is sensitive to heat, and prolonged heating above 500°C in oxygen-containing atmospheres results in cracking and weakening of the grit. Irreversible impairment of the grinding properties takes place during such heating making it entirely unsuitable for use in bonded or coated abrasives. The change appears to involve a change in the chemistry of the boundary phase material and is associated with an increase in oxygen content of the abrasive. In the manufacture of abrasive articles from such grit (although grit produced under reducing conditions may be preferred for coated abrasive purposes) it is necessary to avoid prolonged heating of the grit above 500°C in the presence of oxygen and heating of the grit at or above 1250°C even in the absence of oxygen may be undesirable.

The deleterious effect of prolonged heating is largely eliminated, however by using no carbon or a minimum of carbon in the furnacing operation, or by producing oxidizing conditions such as by an air or oxygen purge of the molten abrasive prior to casting. Such products have been typically found to contain 0.5% or less carbon. Products thus "oxidized" or produced under minimal reducing conditions are found however to be less preferred for coated abrasive use. For coated abrasive uses best results have often been achieved where excess carbon is employed resulting in a dark colored grain in which some reduction products such as carbides, nitrides, or metals are present as evidenced by visual examination.

Convenient methods for achieving the rapid cooling necessary to produce the improved abrasive of this invention are the use of metal balls such as described in the copending application of John K. Shurie, Ser. No. 112,715 filed Feb. 4, 1971, or by pouring the melt between metal plates, as described in the copending application of Scott Ser. No. 212,614 filed Dec. 27, 1971. Air quenching is also possible by pressure atomization in air of the molten abrasives into small spheres having a diameter in the order of 1000 microns and finer. Such air quenched abrasive has somewhat different properties from poured molten materials and does not suffer from subsequent heating in oxygen to the degree shown by the poured materials.

EXAMPLE I

A mixture for fusion in the electric arc furnace was made up of 60 parts by weight of E-286 alumina (fused low soda alumina) with 44¼ parts of zirconia, and ½ part barley coal. The zirconia typically contained 2 to 3% hafnia and 12 of the 44¼ parts consisted of fused zirconia (Q5AlO) having the following typical analysis by weight:

| | |
|---|---|
| $Al_2O_3$ | 9.8% (by difference) |
| $SiO_2$ | 5.24% |
| $Fe_2O_3$ | 0.14% |
| $TiO_2$ | 0.24% |
| CaO | 0.24% |
| MgO | 0.12% |
| $ZrO_2$ | 84.2% (including hafnia) | with the remaining 32¼ parts of zirconia (QI) having the following analysis by weight:

| | |
|---|---|
| $SiO_2$ | 0.56% |
| $Fe_2O_3$ | 0.10% |
| $TiO_2$ | 0.26% |
| CaO | 0.12% |
| MgO | 0.03% |
| $Al_2O_3$ | 0.46% |
| $ZrO_2$ | 98.5% (including hafnia). |

A fusion was made in the conventional manner in an arc furnace arranged for pouring of the molten contents. The four cubic foot furnace employed two 4 inch diameter graphite electrodes, spaced eight inches apart (center to center) and was operated at 85 volts and 175 kilowatts. The average feed rate was 175 to 200 pounds an hour. The product was poured into a cast iron ingot mold filled with 1 inch diameter steel balls. A total of 1712 pounds of material was cast in a series of pours. The average analysis of the composite product made from a number of similar runs was:

| | |
|---|---|
| $Na_2O$ | 0.04% |
| $SiO_2$ | 0.24% |
| $Fe_2O_3$ | 0.13% |
| $TiO_2$ | 0.13% |
| $ZrO_2$ | 39.85% |
| $Al_2O_3$ | 59.61% (by difference). |

The small amount of hafnia is reported at $ZrO_2$ above, and throughout this application. The average rod diameter of the zirconia in the center of the eutectic colonies was found, by a scanning electron microscope, to be less than 2000 angstroms, with a minimum diameter of below the resolution (300 A) of the microscope, the larger diameter rods being found only in small amounts at the slowest cooled portions of the product (furthest removed from the ball cooling surface). The average rod spacing at the colony centers was typically less than 4000 angstroms and the platelet spacing was similar. The average platelet thickness was less than 2000 angstroms at the colony centers.

In the parent applications the average rod diameters were reported as being somewhat smaller than the values given here. These earlier averages were based on the assumption that a substantial portion of the rods had sufficiently small diameters (less than 300 A) as to be unresolved by the scanning electron microscope; this assumption being based on the reported maximum diameter of 300 A for tetragonal zirconia. It is now believed that zirconia rods having a size much greater than 300 A can give an X-ray diffraction pattern indicative of the tetragonal form.

The zirconia was 31% in the tetragonal form, the remainder monoclinic, as determined by measurement of the angular position of the centroid of the powder X-ray diffraction pattern, for the monoclinic doublet peak and the tetragonal peak; at about 30.3° (2 theta), for the tetragonal peak and at about 28.3° and 31.5° for the monoclinic doublet, when copper K radiation is employed. The centroid of the monoclinic-tetragonal triplet is determined by conventional mathematical procedures after the profile of the triplet has been determined by careful counting, the probable counting error being of the order of 2.5% or better. The weight percent of tetragonal can then be read from a calibration curve, based on the following parameters:

Area (integrated intensity) of monoclinic doublet, $A_m$ = 72.73 arbitrary units Area (integrated intensity) of tetragonal peak, $A_t$ = 84.79 arbitrary units Position of monoclinic doublet, $\overline{X}_m$, (measured from 27.00°) = 2.500°

Position of tetragonal, $\overline{X}_t$, (measured from 27.00°) = 3.266°

These parameters were obtained from known samples containing 100% tetragonal and 100% monoclinic zirconia forms. It will be understood that specific values for area and position of peaks in the X-ray tracing will vary somewhat depending upon the instrumental set-up and the quality of the samples used. In the case of tetragonal zirconia the sample was 40% zirconia and 60% alumina. From the mass absorption coefficients it can be calculated that the true intensity of the monoclinic peak in the presence of 60% alumina is 0.58 times the measured integrated intensity, giving a true relative value of 72.73 units. A calibration curve can be obtained, where $\overline{X}_3$ is the angular position (measured from 27.00°) of the centroid, and w is the weight fraction of tetragonal zirconia, from the following relation:

$$\overline{X}_3 = \frac{(1-w) A_m \overline{X}_m + w A_t \overline{X}_t}{(1-w) A_m + w A_t}$$

which relates $\overline{X}_3$ to any given value of w from 0 to 1. Thus for any value of $\overline{X}_3$, determined from a given X-ray diffraction pattern, the corresponding value of w can be calculated or read from the calibration curve. It is in this way that all of the values for percent tetragonal given herein were obtained. We have found that a cooling rate fast enough to cause at least 25% of the zirconia to be in the tetragonal form is necessary to produce the abrasives of this invention. It has also been found that the crystalline form of $Al_2O_3$ known as delta-alumina is contained in samples which include tetragonal zirconia, the amount of delta-alumina increasing as the tetragonal zirconia content increases. In air quenched material containing 100% tetragonal zirconia we have found that essentially all of the alumina appears in the delta-form, as determined by standard powder X-ray diffraction; however the amount of delta alumina is not believed to be proportional to the percent tetragonal zirconia since some analytical x-ray analyses of samples containing up to 40% tetragonal zirconia indicated that essentially all of the alumina was in the alpha form.

The product of Example I was passed through a 20 inch by 6 inch jaw crusher to yield a product ½ inch and finer in size. The ½ inch product is then further crushed by rolls or impact to yield the desired grit sizes for use in bonded or coated abrasives. The abrasive yields superior results in medium and light duty applications. The abrasive grits were largely (51%) pseudo-hackly and predominantly (69%) all-eutectic.

EXAMPLE II

A fusion run similar to Example I was made employing a mix made up of 60 parts by weight of a fused low soda alumina material and 42¾ parts by weight of the higher purity zirconia material of Example I. Three casting methods were employed; 1160 pounds of product was cast on 1 inch diameter steel balls, 205 pounds was cast on ⅝ inch steel balls, and 120 pounds was cast between steel plates, spaced 3/16 inches apart. The analysis of the product was:

| | |
|---|---|
| $SiO_2$ | 0.18% |
| $Fe_2O_3$ | 0.13% |
| $TiO_2$ | 0.13% |
| $ZrO_2$ | 40.40% |
| $Na_2O$ | 0.05% |
| $Al_2O_3$ | 59.11% (by difference). |

The crushed abrasive was employed to make grinding wheels for test. The bond in the wheels was 75% by weight of powdered two stage phenol-formaldehyde resin (Union Carbide BRP5417) and 25% barium sulfate filler. In making the wheels the abrasive grains were wet with a one stage liquid phenolformaldehyde resin and mixed with the powdered resin (which contained 8 – 9% hexamethylenetetramine), and filler. Two grades of wheel were made by cold pressing to stops in a mold and curing conventionally with an upper temperature limit of 175°C, one containing 54% abrasive, 22% bond, and 24% pores, and the other containing 54% abrasive, 26% bond, and 20% pores (all by volume). A similar set of wheels using standard fused alumina was prepared for comparison in foundry snagging employing a standard portable grinder.

The test employed a pneumatic straight grinder, 5900 revolutions per minute wheel speed. The wheels were six inches in diameter, and one inch thick. The workpiece was a cast steel cylinder, 12 inches outside diameter by 10¾ inches inside diameter, mounted on a rotary table at 12 revolutions per minute. The grinding pressure (between the wheel and the ⅝ inch wall surface of the work) was 26 pounds. The wheel wear (W) in cubic inches per hour, pounds of metal removed from the workpiece (M), and grinding ratio (G), pounds of metal removed per cubic inch of wheel wear, are reported below for the standard wheels and the test wheels.

| Wheel | W | M | G |
|---|---|---|---|
| Standard (22% bond) | 9.07 | 7.33 | 2.9 |
| Standard (26% bond) | 7.16 | 6.82 | 3.4 |
| Test (22% bond) | 4.49 | 7.70 | 6.0 |
| Test (26% bond) | 4.19 | 7.55 | 6.4 |

As can be seen from the data, the softer test wheel was more than twice as efficient as the standard wheel, while the harder wheel was not quite (1.89X) twice as efficient as the harder standard wheel. This illustrates the unexpected advantage of the new abrasive under mild (lower pressures, softer wheels) grinding conditions.

The abrasive in this test was first jaw crushed, as in Example I, then impact crushed to produce through 6 mesh on 24 mesh grits, and the through 6 on 10 mesh fraction of the grits was then rolls crushed and screened to produce a 24 grit size for use in making the wheels. Essentially equivalent results can be achieved by substitution of jaw and/or rolls crushing for the impact crushing step. The standard wheels employed regular fused rolls-crushed alumina made by fusing bauxite and having a typical analysis of 95% or more $Al_2O_3$ with the remaining 5% or less being made up of mainly silica, iron, and titania.

The material of Example II which was cast on ⅝ inch balls was somewhat finer in microstructure than the 1 inch ball cast material and had a higher tetragonal zirconia content. The material cast between steel plates had an average zirconia rod diameter of less than 1500 angstrom units and the colony cross-sectional diameter measured 10 to 30 microns on polished sections. In this method of casting the molten abrasive is poured on the top of a plurality of spaced vertical steel plates, each plate being ½ inch or more thick, spaced (for example) 3/16 inches apart. The product is recovered from the spaces between the faces of the plates. Its tetragonal zirconia content is 46%, and its grinding properties are excellent. The grits were 60% psuedo-hackly and 77% all-eutectic.

EXAMPLE III

The furnace mix consisted of 60 parts by weight of fused low silica alumina, and 42¾ parts of the higher purity zirconia employed in Example I.

The mix was fused in the conventional manner employing an average of 175 kilowatts at an average of 85 volts. Product in the amount of 315 pounds, poured on 1 inch steel balls was recovered. The average analysis of the product was:

| | |
|---|---|
| $SiO_2$ | 0.17% |
| $Fe_2O_3$ | 0.15% |
| $TiO_2$ | 0.13% |
| $ZrO_2$ | 38.09% |
| CaO | 0.09% |
| MgO | 0.02% |
| $Na_2O$ | 0.03% |

The alumina is determined by difference in this case to be 61.32%. The impurities are present, essentially, in the colony and grain boundaries. (The product was 57% pseudo-hackly and 71% all-eutectic.) Although the constituents are all reported on the analysis as oxides, some carbides, oxycarbides, nitrides, carbonitrides, oxynitrides, suboxides, and sometimes elemental metal are ordinarily present in the boundary material. Analysis of typical product has shown about 0.1% nitrogen and 0.02 to 0.1% carbon. This can also be demonstrated by the weight gain of the material when subjected to oxidation conditions. It is believed that a portion of this weight gain is due to the uptake of oxygen by non-stoichiometric zirconia in the colonies proper. Where elemental metals or carbon and nitrogen compounds are absent, some weight gain will still be observed.

EXAMPLE IV

Bayer process alumina and baddeleyite were employed in the ratio of 44.4 parts of baddeleyite to 60.5 parts of bayer process alumina, with 2 parts of barley coal, and the fused mixture was cast on 1 inch steel balls. The average product analysis was as follows:

| | | | |
|---|---|---|---|
| $SiO_2$ | | 0.11% | |
| $Fe_2O_3$ | | 0.2% | |
| $TiO_2$ | | 0.36% | |
| $ZrO_2$ | | 40.36% | |
| $Na_2O$ | | 0.08% | |
| Other: | about | 0.08% | (CaO, MgO etc.) |
| $Al_2O_3$ | | 58.2% | |

The baddeleyite employed as the source of $ZrO_2$ had the following typical analysis:

| | |
|---|---|
| $SiO_2$ | 0.63% |
| $Fe_2O_3$ | 0.53% |
| $TiO_2$ | 0.67% |
| CaO | 0.63% |
| MgO | 0.70% |
| $ZrO_2$ | 96.8% |

The wheels were phenolic bonded and included standard commercial fillers. The abrasive grits of this example were 54% pseudo-hackly and 61% all-eutectic. For use in cut-off wheels the grits are preferably impact crushed to a strong shape.

This product of Example IV gives a 400 to 500% increase in efficiency in cut-off wheels, as compared to the best known commercial aluminum oxide cut-off wheel in cutting ductile iron at relatively light pressure, using a 20 horse power standard commercial cut-off machine, operating chopper style on 1⅛ inch cross section workpieces.

EXAMPLE V

Impact crushed (−6, +16), 40% by weight zirconia abrasive grit material, manufactured as in Example 1, was rolls crushed in conventional fashion. The crushed abrasive material was then screened, (to separate out for use those abrasive grains having a grit size 36 as defined in P.S. 8–67, U.S. Department of Commerce) and the screened material was then washed with water. Next, the abrasive material was subjected to a magnetic field to remove any magnetic particles therefrom.

To a 30 mil vulcanized fiber backing member (10 inches × 11 inches) was applied (28.6 pounds per sandpaper maker's ream) a maker adhesive having the following composition:

| Components | Weight |
|---|---|
| 1) Liquid resin No. 1, a phenol-formaldehyde resol resin, having a formaldehyde to phenol ratio of 1.7 to 1, caustic catalyzed, with a solids content of 73%. | 1644 grams |
| 2) Liquid resin No. 2, a phenol-formaldehyde resol resin, having a formaldehyde to phenol ratio of 0.94 to 1, caustic catalyzed, with a solids content of 78.4%. | 650 grams |
| 3) $CaCO_3$ (14 micron) | 3300 grams |
| 4) Water | 165 grams to give a viscosity at 100°F of 8000 centipoise |

Upon the maker adhesive was then electrocoated, according to usual techniques for upper propulsion, the zirconia-alumina abrasive grit above-mentioned. The amount of abrasive grit deposited was 59.0 pounds per sandpaper maker's ream. The thus coated backing member was then heated for 45 minutes at 140°F, 45 minutes at 175°F, 60 minutes at 220°F, and 90 minutes at 250°F.

A size coat composition was then applied to the abrasive grit - maker adhesive surface, such being of the same composition as the maker adhesive except that water has been added thereto (200 grams $H_2O$) to provide a more dilute composition. This composition was applied in sufficient amount to provide a size coat of 27.0 - 29.4 pounds per sandpaper maker's ream (wet weight). Drying and curing was obtained in heating the coated substrate material for 45 minutes at 115°F, 60 minutes at 150°F, 45 minutes at 175°F, 45 minutes at 200°F, 180 minutes at 225°F, and 45 minutes ata 235°F.

The coated abrasive material thus manufactured was then humidified at 50% R.H., 70°F overnite after which a 7 inch diameter disc was die-cut therefrom for evaluation. Prior to evaluation, the abrasive disc was curl corrected according to usual techniques by double flexing, one flex being in a direction perpendicular to the other.

EXAMPLE VA

The abrasive disc in Example V was evaluated in a mechanical disk tester on 1020 LC steel. In this machine, a workpiece (⅛inch × 1 inch × 1 inch × 9¾ inch angle iron) oscillates back and forth at a rate of 7 feet per minute over a distance of 9¾ inches, the ⅛ inch face being ground with the abrasive disc rotating at a speed of 3450 RPM. A force of 12 pounds is maintained against the workpiece by a phenolic back-up pad. The face of the disc was at a 10° angle with the surface being ground.

The performance of the disc of this invention was compared with a similar abrasive product except that the abrasive grain material thereon was of conventional high purity alumina. Over a 10 minute period, the coated abrasive disc of this invention cut 166% that of the control abrasive disc.

EXAMPLE VB

An abrasive disc manufactured as in Example V was evaluated in the machine disclosed in Example VA except that a workpiece of 304 stainless steel was utilized and the abrasive was maintained against the work with a force of 10 pounds.

The coated abrasive material of this invention in 6 minutes cut 154% that of a control disc of conventional high purity alumina.

EXAMPLE VC

Zirconia-alumina abrasive grain material (40% $ZrO_2$) which was manufactured as described in Examples I and II (1 inch ball cast) was jaw crushed to ½ inch chunks. This abrasive material was then rolls crushed to 36 grit size, screened, washed with water, and purged of magnetic particles.

A conventional resole phenol-formaldehyde maker adhesive composition was prepared by mixing together the following:

| Components | Weight |
|---|---|
| Varcum Resin 2535 (a resol having a solids content of 78%, a formaldehyde to phenol ratio of 2.01 to 1, caustic catalyzed and modified with di-propylene glycol | 18 pounds |
| Number 2 liquid resin of Example V | 7.5 pounds |
| $CaCO_3$ (14 micron) | 31.0 pounds |
| $H_2O$ | 2.25 pounds |
| RMR Pontamine brown dye (Dupont Co.) | 24 grams |

This composition (100°F, viscosity 7000 c.p.s.) was coated on the front side of a cotton drills woven backing member (7 oz./yd$^2$) having a 2 × 1 twill construction, a yarn count of 76 in the warp and 48 in the fill directions, yarn numbers of 12s cotton warp and 17s fill, which had been provided with a conventional glue-starch finish. Sufficient composition was deposited on the backing member to provide, on drying and curing, a maker adhesive coat of 21 lbs. per sandpaper maker's ream.

Subsequent to application of the maker adhesive composition, reclaimed abrasive (high purity alumina, 36 grit) was gravity coated (20.8 lbs. per sandpaper maker's ream) on the layer of adhesive composition. This abrasive-adhesive coated backing member was then heated at 170°F for 25 minutes, 190°F for 25 minutes and 225°F for 47 minutes. A second maker adhesive coat was then provided on the backing member, (22 lbs., dry weight, per sandpaper maker's ream), being of the same composition as the first maker coat, upon which was then electrostatically deposited, in conventional fashion, 38.6 lbs. per sandpaper maker's ream of the above-described zirconia-alumina abrasive grit. The abrasive-adhesive coated backing member was then heated as before described.

A size adhesive composition was prepared of the same components as the maker adhesive except that sufficient water was added tehreto to provide a composition having a viscosity of 1100 c.p.s. at 100°F. After application of the size composition, the thus coated backing member was heated at 125°F for 25 minutes, 135°F for 25 minutes, 180°F for 18 minutes, 190°F for 25 minutes and 230°F for 15 minutes. Sufficient size composition was provided to result in a wet weight of 28 lbs. per sandpaper maker's ream. The abrasive-adhesive coated backing member was then given a final cure by heating it for 8 hours at 230°F after which it has ready to be manufactured into abrasive articles for various applications.

EXAMPLE VD

Coated abrasive material manufactured as in Example VC (rubber roll standard single flexed) was slit into appropriate lengths and widths and made, according to usual techniques, into endless abrasive belts (2½ inches × 60 inches). The belts were then evaluated under controlled conditions in a so-called "backstand belt test" wherein, in general, a belt, positioned horizontally, is moved inwardly at a constant pressure and in a direction substantially normal against the ½ inch face of a workpiece (½ inch × 2 inches × 9¾ inches) moving back and forth over a distance of 9¾ inch at 7 feet per minute. In this test, the abrasive belt was driven at 5000 surface feet per minute (SFPM) over a 55 durometer, rubber, vertically disposed, serrated contact wheel (7 inches diameter) with 15 lb. dead weight exerted on a workpiece of A-6 steel.

For purposes of comparison, a control belt of conventional high purity alumina was evaluated in the back stand test in the same manner. The coated abrasive material for the control belt was manufactured as above-described, i.e., a double coat coated abrasive material, except that the weight of abrasive grit (1900 ALUNDUM - high purity alumina) applied in the second coat was 39.9 lbs. per sandpaper maker's ream. The results are tabulated below:

| Belt | Time (Min.) | Cut Grams |
|---|---|---|
| Control | 40 | 677 |
| Zirconia-alumina | 40 | 1235 |
|  | 120 | 2350 |

As indicated by the data, the control belt gave out after 40 minutes and a cut of only 677 grams. However, over the same time period, the belt in accordance with the invention cut 1235 grams (approximately 180% that of the control belt). Moreover, this belt cut for 120 minutes before giving out, the total cut being 2350 grams.

EXAMPLE VE

Abrasive belts as in Example VD were evaluated as described therein except that the workpiece was 304 stainless steel and the belt speed was 3000 SFPM. In a time-end test of 30 minutes, the control belt cut 140 grams; however, the abrasive belt of this invention cut 178 grams

EXAMPLE VF

Abrasive belts as in Example VE were evaluated in the backstand belt test except that, for purposes of comparison, the grinding operation was performed using Stuart's THREAD-CUT No. 99, a sulfur-chlorinated oil, as a grinding lubricant. A 30 minute test resulted in a control belt cut of 145 grams. By comparison, the abrasive belt utilizing the zirconia-alumina abrasive grain of this invention cut 279 grams.

EXAMPLE VG

The abrasive grit material like that of Example II, 1 inch ball cast, was rolls crushed, as before described in Example V to 36 grit, and was used in the manufacture of abrasive discs as described therein. Discs so manufactured were evaluated in the mechanical disc tester and under the same conditions as before-mentioned for the respective type workpieces. The results are indicated below.

| Disc | Time Min. | Workpiece | Cut % |
|---|---|---|---|
| Control* | 10 | 1020 LC Steel | 100 |
| Zirconia-alumina | 10 | do. | 155 |
| Control | 6 | 304 s.s. | 100 |
| Zirconia-alumina | 6 | do. | 162 |

*Control discs contained conventional high purity alumina abrasive.

EXAMPLE VH

A fusion containing approximately 40% zirconia was poured between steel plates spaced 3/16 inches apart. The average analysis of the product was:

| $SiO_2$ | 0.21% |
|---|---|
| $Fe_2O_3$ | 0.15% |
| $TiO_2$ | 0.15% |
| $ZrO_2$ | 40.56% |
| $Na_2O$ | 0.04% |
| $Al_2O_3$ | 58.89% (by difference). |

No analysis was made for the small amounts of lime or magnesia which were present.

Discs of abrasive material, manufactured as described in Example V except that the abrasive grain material was that described above were evaluated grinding workpieces of 1020 L.C. steel and 304 stainless steel. The results were comparable to those obtained in Example VG. The discs manufactured using the zirconia-alumina abrasive material cut 162% better than the control (high purity alumina) in the case of 1020 L.C. steel and 154% better than the control in the case of 304 stainless steel.

EXAMPLE VJ

Coated abrasive material was manufactured as before-described in Example VC. The abrasive (36 grit) utilized in this material was that described in Example VH.

Abrasive belts were manufactured according to usual techniques and these belts were tested, as before-described, in a backstand belt test. The same conditions were used in Example VD. The results are indicated below for the various workpieces. The test were conducted dry except where indicated.

| Belt | Workpiece | Time Min. | Cut Grams | Cut % |
|---|---|---|---|---|
| Control* | 1018 L.C. Steel | 30 | 591 | 100 |
| Zirconia-alumina | 1018 L.C. Steel | 30 | 1410 | — |
|  |  | 60 | 2027 | 343 |
| Control | 304 Stainless Steel | 30 | 133 | 100 |
| Zirconia-alumina | 304 Stainless Steel | 30 | 222 | 167 |
| Control | 4130 Steel | 60 | 1050 | 100 |
| Zirconia-alumina | 4130 Steel | 60 | 2215 | 211 |
| Control** | 1018 | 16 | 208 | 100 |
| Zirconia-alumina** | 1018 | 16 | 455 | — |
|  |  | 40 | 728 | 350 |
| Control** | 304 | 30 | 153 | 100 |
| Zirconia-alumina** | 304 | 30 | 358 | 234 |

*all control belts were of conventional high purity alumina (36 grit) and such were manufactured in the same manner as the belts of this invention, the only difference being the composition of the abrasive material.
**wet grinding using THREAD-CUT No. 99.

EXAMPLE VK

A coated abrasive belt was made of the novel abrasive and compared against a standard belt under the same conditions as in Example VC in grinding 1018 steel.

The backing was the same as in the previous belt example, the front finish of the cloth was a calcium carbonate filled phenol-formaldehyde and the back size was a glue-starch combination with no filler.

The composition of the maker adhesive was as follows:

| Components | Weight |
|---|---|
| Varcum Resin 2535 | 18 pounds |
| Liquid resin No. 2 of Example V | 7.8 pounds |

-Continued

| Components | Weight |
|---|---|
| CaCo₃ (14 micron) | 31 pounds |
| Brown Dye | 21 grams |
| Water | 3 pounds, to give a viscosity of 5000 centipoises at 100°F. |

The maker weight applied was 22 pounds per sandpaper maker's ream for the control and 22.6 pounds for the experimental item. The abrasive was a 40% zironia, cast on 1 inch steel balls, jaw and rolls crushed to 36 grit. The abrasive was electrostatically upwardly propelled in an amount of 58 pounds per sandnpaper maker's ream for the control, and 57.8 pounds for the experimental abrasive. The size coat was the same as the maker coat, but diluted to 1100 centipoise at 100°F, and was applied in the amount of 28 pounds per sandpaper maker's ream (wet weight). The abrasive-adhesive coated backing was heated for 25 minutes at 107°F, 25 minutes at 190°F, and 47 minutes at 225°F, prior to application of the size coat. After sizing, the cure was 25 minutes at 125°F, 25 minutes at 135°F, 18 minutes at 180°F, 25 minutes at 190°F, and 15 minutes at 230°F, following by 8 hours at 230°F.

The test conditions were the same as in Example VD, employing 1018 steel as the workpiece. After 40 minutes the standard control abrasive was used up, having removed 886 grams of steel. After 40 minutes the abrasive of this invention had cut 2196 grams and was used for an additional 32 minutes to give a total metal removal of 2912 grams in 72 minutes.

EXAMPLE VL

Belts were prepared employing standard fused alumina, double coated, to provide the standard. The test belt, employing abrasive grits of the present invention, employed the standard fused alumina undercoat, with the second coat being alumina-zirconia grain such as employed in the previous example.

The backing material was the same as in Example VC; the maker coat was the same as in Example VK. The maker adhesive was applied in the amount of 27.4 pounds per sandpaper maker's ream, for both the control and the test material. The first abrasive coating was applied by gravity in the amount of 35.2 pounds per ream. The second grit coating was 21.8 pounds per ream for the control, and 17.8 pounds per ream for the experimental. The size coat was applied in the amount of 28 pounds (wet) per ream and was the same composition as in Example VJ. The heating and curing cycles were also the same.

Under the same test conditions as the previous examle, for a time of 16 minutes, the control removed 310 grams of 1018 low carbon steel, while the test abrasive removed 494 grams.

For additional comparison of the abrasive of this invention with high quality abrasive of fused alumina, especially manufactured to use iin precision grinding, special resinoid (phenolic) bonded wheels were made up by hot-pressing and curing a mix containing 32% by volume of abrasive and 68% by volume of a two stage powdered phenol-formaldehyde resin (including, in the resin, 30% of 600 grit alumina powder as a filler). In forming the mix a small amount of furfural is employed to wet the abrasive grits.

The wheels were straight wheels, .5 inches in diameter by 3/16 inches thick with a 1¼ inch center hole. The grinding section was a ⅛ inch thick rim and was molded onto a preform to produce the wheel. The grinding operation was fixed feed wet surface grinding. The wheel speed was 5300 surface feed per minute; the table transverse was 50 feet per minute; the unit cross-feed was 50 mils; the unit downfeed was 1 mil; the materials ground were Huron (D3) die steel (Rockwell C hardness 55), and 1045 mild steel (Rockwell b hardness 89), 2 inches wide by 16 inches long. The total downfeed was 20 mils per run, 1 run per wheel; the coolant was water with corrosion inhibitiors.

The control abrasive was high purity fused alumina crystallized from an aluminum sulfide matrix, as described in U.S. Pat. Re No. 20,547, and sold by Norton Company, Worcester, Massachusetts, under the designation 32 ALUNDUM. This type of abrasive is free of thermal strains, is essentially monocrystalline and, in this type of precision grinding, gives as high grinding ratios any known commercially available aluminum oxide abrasives.

The average value for G ratio for the control abrasive was 15.7 volumes of metal removed per volume of wheel wear for the mild steel. The near-eutectic zirconia alumina of this invention, poured between 3/16 inch spaced steel plates gave a G ratio of 29 in grinding the MS steel. In both cases 60 grit size abrasive was employed. Material of the invention cast on 1 inch balls gave an average G value of 24 for 13 test wheels.

For D3 die steel, the G values were 4.0 for the control and 6.7 for the abrasive of this invention, poured between 3/16 inch spaced steel plates. For 1 inch ball cast material it was 4.6.

Such tests also show the effect of impurities, indicating that the soda content of the abrasive should be 0.1% or lower, by weight. Peak performance has been found with a zirconia content of 38 to 44%, with highest performance at 40.5 to 43.2%. Good results are achieved in the range of 35 to 44%, and zirconia contents as high as 50% are accetable. A sample containing 68% zirconia was unacceptable in precision grinding.

EXAMPLE VI

A series of castings of abrasive material were made from a few melts having the following general composition:

| | % by weight |
|---|---|
| Al₂O₃ | 58.15 (diff.) |
| ZrO₂ | 41.3 |
| SiO₂ | 0.22 |
| Na₂O | 0.02 |
| TiO₂ | 0.15 |
| Fe₂O₃ | 0.16 |

This molten abrasive was cast into a number of different types of molds as described below:
- 50 lb. ingot mold - a cast iron mold having an interior mold cavity 8 inches by 18 inches by 9 inches. s
- 25 lb. ingot moldl - a cast iron mold having an interior mold cavity 5½ inches by 13½ inches and 4½ inches.
- lump cast - a cast iron mold 8 inches by 18 inches by 9 inches filled with ¾ inches lumps of abrasive grain having essentially the same composition and crystal structure as the material reported as 7920 in Tables 1 and 2 under "lump cast" (the procedure of Pett and Kinney S.N. 98,014 1¾ inch ball cast - a cast iron mold 8 inches by 18 inches by 9 inches filled with 1¾ inch diameter cast iron balls.

1 inch ball cast - a cast iron mold 8 inches by 18 inches by 9 inches filled with 1 inch diameter cast iron balls.

3/16 inch S mold - a sheet iron mold having vertically arranged iron partitions ¾ inch thick spaced 3/16 inch apart.

The product resulting from the various casting techniques was then jaw crushed in conventional fashion to ½ inch chunks. The chunks of abrasive material were then rolls crushed and screened to separate out those abrasive particles having a grit size of 36. The screened material was then washed with water and subjected to a magnetic field to remove any magnetic particles therefrom.

Coated abrasive material was then manufactured from the various fused grit as in the manner described in Example VK except that the maker adhesive used was of the composition set forth in Example VC. The maker adhesive composition, however, contained no dye.

The backing member was the same as that described in Example VC, a cotton drills woven fabric, and the maker weight applied was 23 lbs. per sandpaper makers ream. Abrasive grits (target weight 71 lbs./sandpaper makers ream (actual 71 + 1-2 lbs.) were electrostatically coated onto the adhesive coated backing member in each instance after which it was heated for 23 minutes at 175°F., 23 minutes at 195°F., 15 minutes at 210°F., and 23 minutes at 225°F. The size coat (a less viscous maker composition) was then applied and the adhesive coated backing member was then heated for 26 minutes at 130°F., 26 minutes at 140°F., 19 minutes at 190°F., 25 minutes at 200°F., and 15 minutes at 230°F. After this the abrasive material was given a final cure for 8 hours at 230°F.

Abrasive material was manufactured in a similar manner as a control for evaluation of the above-manufactured abrasive material except that 1900 ALUNDUM - a high purity alumina-abrasive grit was used. The amount of abrasive grit applied (target weight) was 61 lbs./sandpaper makers ream.

Abrasive belts were manufactured as disclosed in Example VB from the various abrasive material provided, the belts then being evaluated on a bench back stand belt tester as disclosed in Example VD on 1018 steel. The results are indicated below:

Table 1

| Run No. | Description | Rate of Cut as Compared to Standard | | | |
|---|---|---|---|---|---|
| | | Test 1 | Test 2 | Test 3 | Test 4 |
| Standard | | 100% | 100% | 100% | 100% |
| 7916 | 50 lbs. ingot | 138 | 134 | 132 | 131 |
| 7917 | 25 lbs. ingot | 135 | 135 | 134 | 128 |
| 7920 | Lump Cast | 150 | 138 | 140 | 159 |
| 7918 | 1¾" ball cast | 180 | 149 | 150 | 191 |
| 7919 | 1" ball cast | 181 | 157 | 155 | 171 |
| 7921 | 3/16" S mold | 178 | 148 | 150 | 189 |
| Composite* | 3/16" S mold | 166 | 176 | 173 | 157 |

* Mixture from a number of commercial batches.

The material was also analyzed by scanning electron microscope to determine, eutectic colony size, $ZrO_2$ rod spacing and $ZrO_2$ rod size. The results were as follows:

Table 2

| Run No. | Description | Eutectic Colony Size (Microns) | | | $ZrO_2$ Rod and/or Platelet Size (Microns) | | | $ZrO_2$ Rod and/or Platelet Spacing (Microns) | | |
|---|---|---|---|---|---|---|---|---|---|---|
| | | Min. | Max. | Ave. | Min. | Max. | Ave. | Min. | Max. | Ave. |
| 7916 | 50 lbs. Ingot | 20 | 500 | 165 | 0.1 | 0.8 | 0.36 | 0.3 | 1.2 | 0.55 |
| 7917 | 25 lbs. Ingot | 14 | 370 | 115 | 0.15 | 0.6 | 0.29 | 0.28 | 0.74 | 0.54 |
| 7920 | Lump Cast | 8 | 80 | 32 | 0.2 | 0.6 | 0.28 | 0.3 | 1.0 | 0.51 |
| 7918 | 1¾" Ball Cast | 6 | 100 | 37 | 0.1 | 0.3 | 0.18 | 0.21 | 0.5 | 0.35 |
| 7919 | 1" Ball Cast | 6 | 46 | 22 | 0.1 | 0.25 | 0.15 | 0.2 | 0.5 | 0.29 |
| 7921 | 3/16" S Mold | 4 | 44 | 20 | 0.1 | 0.3 | 0.13 | 0.15 | 0.5 | 0.25 |
| Composite | 3/16" S Mold | 2 | 52 | 21 | 0.1 | 0.4 | 0.16 | 0.18 | 0.48 | 0.29 |

Since the melting and pouring procedure necessarily involved dinterrupted pouring with additions to the melt and, in some cases different starting melts, the chemical composition of the various runs varied somewhat as indicated below:

Table 3

| Run No. | Composite | 7916 | 7917 | 7918 | 7919 | 7920 | 7921 |
|---|---|---|---|---|---|---|---|
| $ZrO_2$ | 44.22 | 42.86 | 41.33 | 40.73 | 40.69 | 40.60 | 40.55 |
| $Al_2O_3$ | (by difference) | | | | | | |
| $SiO_2$ | 0.21 | 0.18 | 0.22 | 0.22 | 0.19 | 0.19 | 0.21 |
| $Na_2O$ | 0.03 | 0.02 | 0.02 | 0.01 | 0.01 | 0.02 | 0.02 |
| $TiO_2$ | 0.20 | 0.15 | 0.15 | 0.16 | 0.15 | 0.16 | 0.14 |
| $Fe_2O_3$ | 0.11 | 0.10 | 0.16 | 0.18 | 0.18 | 0.16 | 0.17 |

In addition to its use as a coated abrasive, the abrasive material (36–60 grit) made in Example VI was also formed into grinding wheels. These wheels were 5 inches in diameter 3/16 inch thick and had a resinoid type bond similar to that described on page 32. These wheels were then tested in a surface precision grinding test of the type described on pages 32 and 33. The grinding results are set forth below in comparison to a commercial aluminum oxide wheel.

Table 4

| Run No. | Description | Grinding Ratios | |
|---|---|---|---|
| | | 1045 Steel | Huron Die Steel |
| 7916 | 50 lb. ingot | 12.9 | 2.89 |
| 7917 | 25 lb. ingot | 12.9 | 2.54 |
| 7920 | Lump Cast | 21.1 | 4.54 |
| 7918 | 1¾" Ball Cast | 25.0 | 5.36 |
| 7919 | 1" Ball Cast | 25.2 | 5.37 |
| 7921 | S Mold | 24.0 | 5.03 |
| Commercial Aluminum Oxide (32 Alundum) | | 20.9 | 3.15 |

In some other tests of grinding wheels where a lower percentage of resin bond was employed the advantages for the new abrasive over prior art alumina zirconia abrasives have been minimal or nonexistent. In these other grinding wheels it is believed that the lack of superior results was due to lack of adequate bond, thus pointing out the dependance on the bond and bonding strength of the wheel structure to achieve the value inherent in the abrasive. If the bond supporting the abrasive is not sufficiently strong to hold the abrasive while permitting gradual breakdown of the individual grits, the self-sharpening characteristics of the pseudo-hackly fracture along the grain and colony boundaries will not be achieved. The requisite "bond strength" will be related to the grit size, grit shape and grinding application.

Obvious other variations can be made in the practice of this invention. The essential requirement as to cooling is only that the cooling be rapid enough to achieve, in the disclosed compositions, an average zirconia rod and/or platelet diameter of 2000 angstroms or less, or rod and/or platelet spacing of less than 4000 angstroms.

Where used in the attached specification and claims the expression "average" shall mean numerical average and the expression "percent" shall mean weight percent unless otherwise indicated.

What is claimed is:

1. Abrasive grits consisting essentially of co-fused alumina-zirconia, said alumina-zirconia abrasive having been solidified from the molten state at least as rapidly as is accomplished by casting molten alumina-zirconia abrasive into a mold filled with 1¾ inch diameter cast iron balls said alumina-zirconia being predominantly in the form of oriented eutectic colonies associated together as grains within said grits, the zirconia in said colonies being in the form of rods and/or platelets, the maximum average rod spacing and platelet spacing being 4000A, as measured at the colony centers by the random intercept technique, and the maximum average size of primary alumina or zirconia crystals, if any are present, being less than 50 microns, the zirconia content of the abrasive being from 35 to 50%, said abrasive grits having the characteristic that they will fracture along and across colony boundaries when subjected to grinding action while partially embedded in a cured thermoset resin, the fracture providing striated or columnar surfaces generally parallel to the long axes of the colonies and stepped fracture surfaces across said long axes.

2. A coated abrasive comprising a flexible backing member having adhesively bonded thereto abrasive grits consisting essentially of co-fused alumina-zirconia, said alumina-zirconia abrasive having been solidified from the molten state at least as rapidly as is accomplished by casting molten alumina-zirconia abrasive into a mold filled with 1¾ inch diameter cast iron balls said alumina-zirconia being in the form of oriented eutectic colonies associated together as grains within said grits, the zirconia in said colonies being in the form of rods and/or platelets, the maximum average rod spacing and platelet spacing being 4000A, as measured at the colony centers by the random intercept technique, and the maximum average size of primary alumina or zirconia crystals, if any are present, being less than 50 microns, the zirconia content of the abrasive being from 35 to 50%, the average ratio of the maximum to minimum dimension of the abrasive grits is at least 1.2 to 1, the adhesive bond being sufficiently strong to hold the alumina-zirconia grits to permit fracture thereof during grinding with creation of new cutting edges on the individual grits as the result of the fracture, the fracture providing striated or columnar surfaces generally parallel to the long axes of the colonies and stepped fracture surfaces across said long axes.

3. A grinding wheel formed of abrasive grits held in an adhesive bond, the majority of said abrasive grits consisting essentially of co-fused alumina-zirconia, said alumina-zirconia abrasive having been solidified from the molten state at least as rapidly as is accomplished by casting molten alumina-zirconia abrasive into a mold filled with 1 3/4 inch diameter cast iron balls said alumina-zirconia being in the form of oriented eutectic colonies associated together as grains within said grits, the zirconia in said colonies being in the form of rods and platelets, the maximum average rod spacing and platelet spacing being 4000A, as measured at colony centers by the random intercept technique, and the maximum average size of primary alumina or zirconia crystals, if any are present, being less than 50 microns, the zirconia content of the abrasive being from 35 to 50%, the adhesive bond being sufficiently strong to hold the alumina-zirconia grits to permit fracture thereof during grinding with creation of new cutting edges on the individual grits as the result of the fracture.

4. Abrasive grits as in claim 1 in which at least 25% of the zirconia is in the tetragonal crystal form.

5. A coated abrasive as in claim 2 in which at least 25% of the zirconia in the abrasive is in the tetragonal crystal form.

6. Abrasive grits as in claim 1 including, along colony boundaries, impurities selected from the group consisting of metals and reduction products of metal oxides, and mixtures thereof.

7. A coated abrasive as in claim 2 in which the abrasive grits include, along colony boundaries reduction products of the oxides of metals contained in the abrasive composition.

8. A coated abrasive as in claim 2 in which at least 50% of the alumina-zirconia abrasive grits exhibit a pseudo-hackly fracture.

9. A coated abrasive as in claim 2 in which at least 50% of the alumina-zirconia abrasive grits exhibit an all eutectic structure, that is with no apparent primary alumina or primary zirconia crystallization when polished sections of the grits are examined under a microscope.

* * * * *